United States Patent
Maraux et al.

(10) Patent No.: US 7,520,446 B2
(45) Date of Patent: Apr. 21, 2009

(54) THERMOSTATIC VALVE FOR A FLUID CIRCUIT, HEAT ENGINE ASSOCIATED WITH A COOLING CIRCUIT INCLUDING SUCH A VALVE, AND METHOD FOR MANUFACTURING SUCH A VALVE

(75) Inventors: Thierry Maraux, Les Clayes Sous Bois (FR); Alain Bouloy, Etrechy (FR)

(73) Assignee: Vernet, Ollainville (FR)

( * ) Notice: Subject to any disclaimer, the term of this patent is extended or adjusted under 35 U.S.C. 154(b) by 502 days.

(21) Appl. No.: 11/252,209

(22) Filed: Oct. 18, 2005

(65) Prior Publication Data
US 2006/0113399 A1 Jun. 1, 2006

(30) Foreign Application Priority Data
Oct. 18, 2004 (FR) .................... 04 11010

(51) Int. Cl.
  *F23N 1/00* (2006.01)
  *G05D 23/02* (2006.01)
(52) U.S. Cl. .............. 236/95; 236/99 K; 236/99 J; 236/100
(58) Field of Classification Search .......... 236/95, 236/96, 86, 99 J, 99 K, 100, 93 A
See application file for complete search history.

(56) References Cited

U.S. PATENT DOCUMENTS

| | | | | |
|---|---|---|---|---|
| 4,313,561 A | * | 2/1982 | Kenny | 237/12.3 A |
| 6,764,020 B1 | * | 7/2004 | Zhao et al. | 236/68 R |
| 7,036,745 B2 | * | 5/2006 | Bouloy et al. | 236/101 R |
| 7,275,697 B2 | * | 10/2007 | Roman et al. | 236/93 R |
| 2002/0070367 A1 | | 6/2002 | Friesenhahn | |
| 2004/0163612 A1 | | 8/2004 | Takahashi | |

FOREIGN PATENT DOCUMENTS

| | | |
|---|---|---|
| EP | 0853267 | 7/1998 |
| FR | 2853710 | 10/2004 |

* cited by examiner

*Primary Examiner*—Marc E Norman
(74) *Attorney, Agent, or Firm*—Dowell & Dowell, P.C.

(57) ABSTRACT

A thermostatic valve mounted within a housing which defines a fluid circuit and wherein an internal valve seat is defined withing the housing, the thermostatic valve including a blocking valve component movable relative to the valve seat for opening and closing the fluid circuit, a thermostatic element for actuating the blocking valve and including a body and a piston that are relative movable with respect to one another and a base to which the piston is mounted, an electrical heating element mounted within the and piston of the thermostatic element for heating expansible material contained in the element, wherein one end of the piston is seated and sealed within a blind hole in the base and the base is seated and sealed within a blind cavity in the housing and which cavity has a bottom wall formed integrally with the housing through with electrical pins extend toward the outside of the housing.

7 Claims, 1 Drawing Sheet

THERMOSTATIC VALVE FOR A FLUID CIRCUIT, HEAT ENGINE ASSOCIATED WITH A COOLING CIRCUIT INCLUDING SUCH A VALVE, AND METHOD FOR MANUFACTURING SUCH A VALVE

BACKGROUND OF THE INVENTION

1. Field of the Invention

The present invention concerns a thermostatic valve for a fluid circuit, including a thermostatic element of expansible material. It also concerns a heat engine associated with a cooling fluid circuit equipped with such a valve, and also a method for manufacturing such a valve.

2. Brief Description of the Related Art

In numerous applications of the field of fluidics, especially for the cooling of heat engines of vehicles, such valves are used for distributing a fluid entering by different circulation paths according to the temperature of the incoming fluid. In order to distribute the fluid according to other parameters, especially conditions outside the valve, such as ambient temperature or the load of the vehicle propelled by the engine equipped with the valve, it is known to provide means for electrical heating of the expansible material contained in the thermostatic element of the valve. It is then possible to control the actuation of the thermostatic element from outside the valve, independently of, or as a complement to the temperature of the incoming fluid, especially by means of an onboard computer in the vehicle, programmed accordingly.

It is however necessary to supply electricity to the heating means, such as a heating resistance, that are located in the expansible material of the thermostatic element, while the latter is at least partially immersed in the flow of fluid to be regulated by the valve.

In order partly to remedy this difficulty, it is known to arrange the heating resistance inside a piston of the thermostatic element, partially immersed in the expansible material and mounted so as to slide with respect to the body of the thermostatic element containing the material. By immobilising the piston with respect to the valve housing, supplying power to the resistance brings about the expansion of the material, thereby causing the body of the thermostatic element to slide round the fixed piston, a blocking means being carried by the body so as to act on the circulation of the fluid in the valve.

The arrangement of such a "heating piston" within the valve, as proposed in EP-A-0 853 267, is however complex to produce and raises problems of providing a tight seal, in particular in the area of electrical junction between the connection terminals of the heating piston, that are accessible from outside the housing, and an electric power supply element, such as a cable or the like.

SUMMARY OF THE INVENTION

The aim of the present invention is to propose a thermostatic valve with heating piston, the manufacture of which is simplified, while guaranteeing a tight seal in the area of electric power supply to the heating piston.

To this end, the subject of the invention is a thermostatic valve for a fluid circuit, including:
- a housing delimiting internally at least one fluid circulation path,
- a blocking means for blocking the circulation path,
- a thermostatic element which comprises on the one hand a body containing an expansible material, disposed in the path of the fluid following the circulation path and carrying the blocking means, and on the other hand a piston immobilised with respect to the housing and capable of sliding with respect to the body of the thermostatic element under the action of the heated expansible material,
- means for the electrical heating of the expansible material that are disposed, at least partially, inside the piston of the thermostatic element, and
- means for electrical connection between the outside of the housing and the heating means, comprising at the same time at least one electrical contact pin, accessible from outside the housing, a connection base for connection of an element for supplying electric power to the contact pin or pins, electrical conductors which connect the contact pin or pins to the heating means, and a support base for the conductors and for the contact pin or pins which is firmly connected to the housing, wherein the support base is adapted to be fitted and immobilised in a substantially complementary blind cavity, delimited internally by the housing, and wherein the housing includes a wall which is traversed by the contact pin or pins, with a sealing gasket interposed, and which delimits on one side the cavity, and on the other side the connection base which is formed integrally with the housing.

The tight seal at the connection base of the valve of the invention is thus basically provided by the valve housing. In this way, the electric power supply to the connection means is provided under good sealing conditions, even if an electric power supply cable is subsequently connected and disconnected during the installation and maintenance of the valve within the fluid circuit. The manufacture of the valve is furthermore simplified, especially by reduction of the number of sealing elements to be used. The use of the support base, to be placed in the blind cavity through the inside of the housing, facilitates the manufacture of the valve; on the one hand, standardised valve housings may be utilised, especially at the connection base solidly and accurately connected to the rest of the housing, while on the other hand different types of base may be fitted in the housing, especially according to the dimensional and functional characteristics of the thermostatic element provided in the valve.

According to other characteristics of the thermostatic valve, taken separately or according to all the combinations technically possible:
- the connection base extends generally round the direction of slide of the piston, projecting, towards the outside of the housing, from the housing wall traversed by the contact pin or pins;
- the blind cavity is generally cylindrical in shape and is delimited by an annular housing wall, the longitudinal axis of which corresponds to the direction of slide of the piston;
- the support base is produced from a plastics material, especially that constituting the housing;
- the conductors comprise at least one electrical wire having a first terminal connected to the heating means and a second terminal connected to the contact pin(s), and in that the connection means include at least one tab for mechanical retention of said wire with respect to the pin(s);
- the conductors comprise at least one bar, formed integrally with the pin and to which the second terminal of the electrical wire is connected, and in that the tab is soldered or crimped onto the bar.

Also a subject of the invention is a heat engine associated with a cooling fluid circuit, which circuit includes a valve as defined above.

A further subject of the invention is a method for manufacturing a valve such as defined above, which method includes the steps consisting in:
- moulding the housing of the valve, and
- providing the support base carrying the pin or pins and the conductors, wherein the connection base is moulded together with the housing inside which the blind cavity is delimited, and wherein the support base is then fitted inside the housing until it is immobilised in the blind cavity, with the sealing gasket being interposed.

According to the advantageous features of this method:
- the support base is fitted inside the housing by being introduced therein in the direction of slide of the piston, via the fluid circulation path; and/or
- the support base is immobilised in the blind cavity by force-fitting or by clipping.

BRIEF DESCRIPTION OF THE DRAWING

The invention will be more clearly understood on reading the following description, provided solely by way of example and with reference to the drawing, in which.

DESCRIPTION OF THE PREFERRED EMBODIMENT

Figure 1:
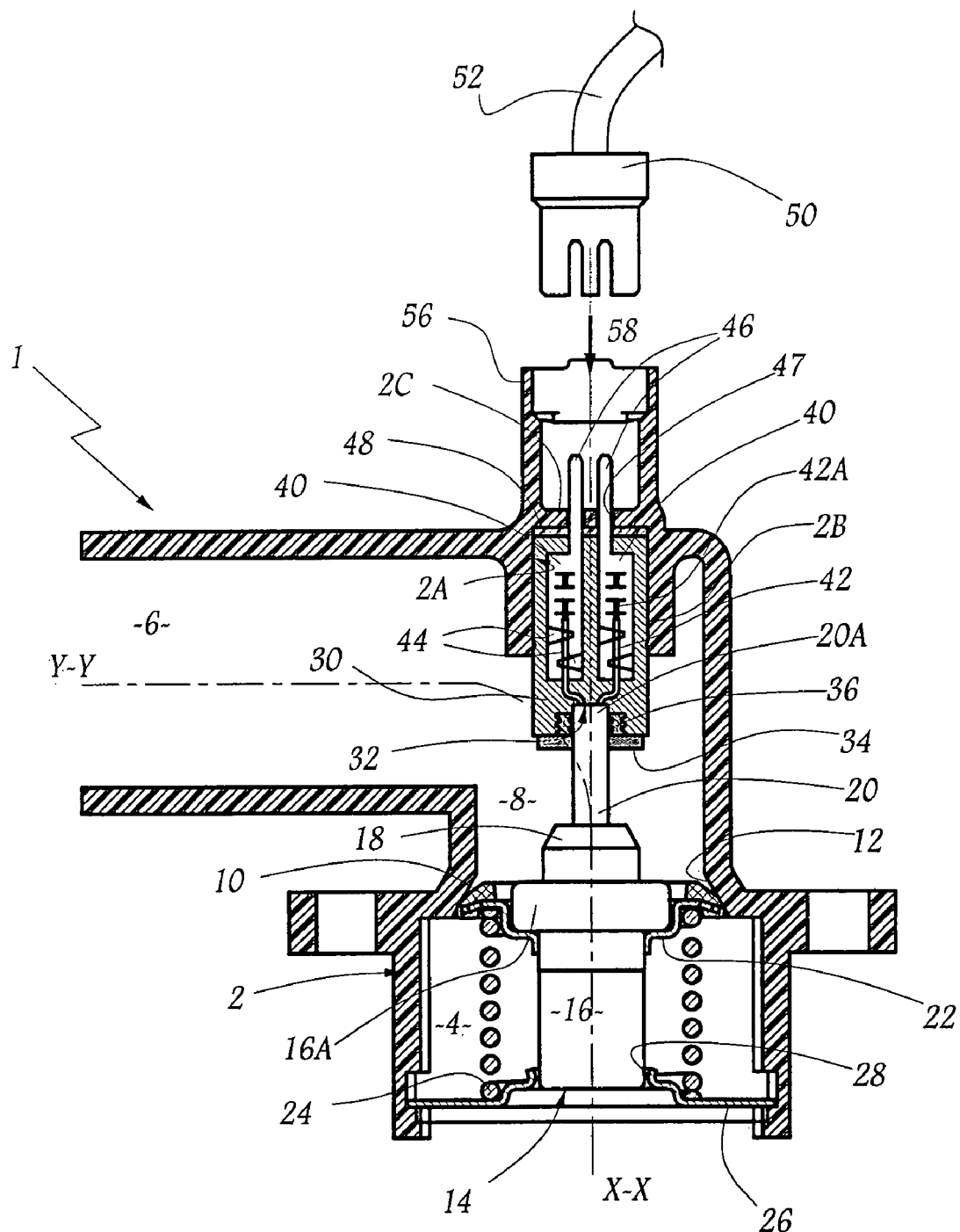
FIG. 1 is a diagrammatic view in longitudinal section of a thermostatic valve according to the invention.

FIG. 1 shows a thermostatic valve 1 suitable for use with a cooling circuit, especially for a heat engine of a motor vehicle. The valve includes a rigid housing 2 made of a plastics material and including two conduits 4 and 6 which extend in respective longitudinal directions X-X and Y-Y substantially perpendicular to each other. The conduits open one into the other at an elbow junction zone 8 of the housing. By way of example, when the valve 1 is used in a cooling circuit of a heat engine, the conduit 4 is fed with cold fluid intended to communicate, under certain conditions detailed hereinafter, and via the zone 8, with the conduit 6 which forms an outlet of cold fluid in the direction of a heat exchanger.

The valve 1 is equipped with a regulating stop valve 10 for regulating the rate of flow of fluid from the conduit 4 to the conduit 6, via the zone 8. The stop valve 10 is associated with a seat 12 delimited internally by the housing 2. The stop valve is arranged to move away from or towards the seat 12, so that when the stop valve bears against its seat the rate of flow of fluid passing from the conduit 4 to the conduit 6 is substantially zero, while when the stop valve is moved away from the seat, the fluid feeding the conduit 4 passes substantially freely into the outlet conduit 6.

In order to control the displacement of the stop valve 10 with respect to the seat 12, the valve 1 is equipped with a thermostatic element 14 which comprises:
- a body 16 composed of a material which is a good conductor of heat, for example a metallic material, and containing internally an expansible material, generally wax, confined in a sealed manner by a cover 18, and
- a piston 20 in the form of a rod that is movable with respect to the body 16, and one end of which (not visible in the drawing) is immersed in the body 16 such that the expansion of the wax results in relative sliding between the piston and the body.

In the assembled state of the valve 1, that is, in the state shown in FIG. 1, the thermostatic element 14 is disposed coaxially with the conduit 4, that is, its longitudinal axis substantially coincides with the axis X-X, and the body 16 of the thermostatic element is disposed in the inlet conduit 4, upstream of the stop valve 10 which is firmly connected to the body 16, at its end 16A at which the piston 20 slides along the axis X-X. The stop valve 10 is firmly connected to the body 16 via a solid rigid ring 22 into which the end 16A is force-fitted.

In the assembled state of the valve 1, the piston 20 is immobilised with respect to the housing 2, by arrangements described hereinafter. Consequently, when the wax contained in the body 16 is heated and expands, the body 16 is entrained in translation along the axis X-X, on the opposite side from the piston. In other words, in FIG. 1, the body 16 is then translated downwards and entrains the stop valve 10, via the ring 22, freeing the seat 12. In order to permit the return of the stop valve to its seat when the wax cools, the valve 1 is equipped with a compression spring 24 interposed between the ring 22 and a rigid, pierced stirrup 26 firmly connected to the housing 2. The stirrup bounds a central opening 28 inside which the body 16 can slide freely along the axis X-X, the opening thus forming a displacement guide for the body 16.

The immobilisation of the piston 20 relative to the housing 2 is effected by means of a rigid base 30 composed of a plastics material, especially that of the housing 2. The base 30, to this end, delimits a blind seating 32 for receiving the free end 20A of the piston 20, the end 20A being arranged to bear against the bottom of the seating 32. A mechanical connecting sleeve 34 is arranged between the piston and the base 32, with a sealing gasket 36 being interposed.

In the assembled state of the valve 1, the base 30 is fixedly received in a blind cavity 2A substantially complementary to the base and delimited internally by the housing 2. By way of example, the base 30 is generally in the shape of a cylinder with axis X-X, received in the cavity 2A, also cylindrical and delimited by an annular wall 2B with longitudinal axis X-X.

The base 30 is immobilised in the cavity 2A, for example by being force-fitted or clipped.

In order to control the displacement of the stop valve 10 in a manner complementary to, or independent of, the temperature of the fluid entering the valve 1 through the conduit 4, the piston 20 is equipped internally with an electrical heating resistance (not visible in the drawing). It will be understood that, when the resistance is supplied with electricity, the wax contained in the body 16 of the thermostatic element 14 expands and, as explained above, the body 16 is translated so as to move away from the base 30.

The circulation of the power supply current of the heating resistance is provided by a pair of conductive bars 40 carried by the base and connected, via a pair of electrical wires 42, to the terminals of the electrical heating resistance. Each bar 40 is connected to the terminal 42A of one of the wires 42, opposed to the terminal of the wire connected to the heating resistance. Each wire is mechanically retained against the bar by clamping tabs 44 soldered or crimped on to the bar.

Each bar 40 comprises an electrical contact pin 46 arranged to be supplied, by contact, with a current outside the valve 1. Each bar 40 is embedded in the plastics material constituting the base 30, except at its pin 4.6 which extends so that it at least partially projects from the material. In the assembled state of the valve 1, the projecting parts of the pins 46 are accessible from outside the housing 2, being disposed in complementary passages 47 passing right through the wall 2C of the housing 2 constituting the bottom of the cavity 2A. The passages are sealed by a substantially flat gasket 48 interposed, on the axis X-X, between the base 30 and the bottom wall 2C.

The pins 46 are configured so that they can be introduced into an electric power plug 50 connected, via a cable 52, to a power supply source that is not shown. The plug 50 is connected by contact to the pins 46, by being engaged, as indicated by the arrow 58, and removably immobilised, in a connection base 56 formed integrally with the housing 2. The base extends generally round the axis X-X, projecting, towards the outside of the housing, from the bottom wall 2C. The pins 46 are disposed in the internal volume of the base 56.

In other words, the pins 46 and the base 56 constitute an electrical contact socket, associated in a complementary manner with the power supply plug 50 which can thus be connected and disconnected at will, relative to the pins 46 and the base 56.

The valve 1 is manufactured by providing on the one hand the housing 2, moulded in one piece with the connection base 56, and on the other hand an assembly comprising the base 30 equipped with the bars 40 and the piston 20. This assembly is obtained by moulding the base 30 round the bars 40 previously electrically connected to the heating resistance housed in the piston 20 by the wires 42 retained by the tabs 44.

The aforesaid assembly is then fitted inside the housing 2, being introduced therein along the axis X-X via the conduit 4, until the base 30 is immobilised in the cavity 2A, with the sealing gasket 48 being interposed.

In order to facilitate the installation of the base 30 inside the cavity 2A, the piston 20 is manipulated while it is partly not yet introduced into the body 16 of the thermostatic element 14, the body, equipped with the ring 22 and the stop valve 10, being able to be fitted during a subsequent stage of assembly.

Various arrangements and variants of the valve 1 described above may further be envisaged. In particular, the shape and the geometry of the conduits 4 and 6 and of the junction zone 8 may be arranged according to the area in which the valve is installed within the fluid circulation circuit that is to be regulated. Moreover, as an option, the body 16 of the thermostatic element may be equipped, at its end opposed to its end 16A, with another stop valve, termed a by-pass stop valve, adapted to be entrained in motion by the body 16. When the thermostatic element 14 is actuated, the by-pass stop valve partially or completely blocks a supplementary fluid access delimited by the housing 2 or by a secondary housing added on to the housing 2.

In addition, as a variant that is not shown, the contact socket comprising the base 56 and the pins 46 may have a male configuration, complementary to a female supply socket.

The invention claimed is:

1. A thermostatic valve for a fluid circuit, including:
   a housing having at least one fluid circulation path therein,
   a blocking valve means for opening and closing the circulation path,
   a thermostatic element including a body containing an expansible material and a piston engaging the body such that the body and piston are movable relative to one another under action of the heat expansible material, the body being disposed in the fluid circulation path and carrying the blocking valve means, and the piston being immobilized with respect to the housing,
   electrical heating means for heating the expansible material, the electrical heating means being disposed, at least partially, within the piston of the thermostatic element,
   connection means for forming an electrical connection between an outside of the housing and the heating means including at least one electrical contact pin accessible from outside the housing, a connection base for connection of an element for supplying electric power to the at least one electrical contact pin, electrical conductors which connect the at least one electrical contact pin to the heating means, and a support base for the conductors and for the at least one electrical contact pin which is firmly connected to the housing, and
   wherein the support base is immobilized in a substantially complementary blind cavity formed internally of and integrally with the housing, and wherein a bottom of the cavity includes a wall which is traversed by the at least one electrical contact pin and a sealing gasket being interposed between the wall and the support base.

2. The thermostatic valve according to claim 1, wherein the connection base extends generally along an axis X-X of the piston and the body, projecting, towards the outside of the housing, from the housing wall traversed by the at least one contact pin.

3. The thermostatic valve according to claim 1, wherein the blind cavity has a generally cylindrical shape and is defined by an annular housing wall the longitudinal axis of which corresponds to an axis X-X of the piston and the body.

4. The thermostatic valve according to claim 1, wherein the support base is made of a plastic material.

5. The thermostatic valve according to claim 1, wherein the conductors include at least one electrical wire having a first terminal connected to the heating means and a second terminal connected to the at least one contact contact pin, and wherein the connection means includes at least one tab for mechanical retention of the at least one electrical wire with respect to the at least one pin.

6. The thermostatic valve according to claim 5, wherein the conductors include at least one bar formed integrally with the at least one pin and to which is connected the second terminal of the electrical wire, and wherein the tab is secured to the bar.

7. A heat engine comprising; a housing defining a fluid circuit for cooling the engine, which circuit includes a valve seat mounted within the housing, a blocking valve means for opening and closing the circulation path,
   a thermostatic element including a body containing an expansible material and a piston engaging the body such that the body and piston are movable relative to one another under action of the heat expansible material, the body being disposed in the fluid circulation path and carrying the blocking valve means, and the piston being immobilized with respect to the housing,
   electrical heating means for heating the expansible material, the electrical heating means being disposed, at least partially, within the piston of the thermostatic element,
   connection means for forming an electrical connection between an outside of the housing and the heating means including at least one electrical contact pin accessible from outside the housing, a connection base for connection of an element for supplying electric power to the at least one electrical contact pin, electrical conductors which connect the at least one electrical contact pin to the heating means, and a support base for the conductors and for the at least one electrical contact pin which is firmly connected to the housing, and
   wherein the support base is immobilized in a substantially complementary blind cavity formed internally of the housing, and wherein the housing includes a wall which is traversed by the at least one electrical contact pin and a sealing gasket being interposed between the wall and the support base.

* * * * *